United States Patent
Kasslin et al.

(10) Patent No.: US 9,473,978 B2
(45) Date of Patent: Oct. 18, 2016

(54) EFFICIENCY IN WIRELESS NETWORK

(75) Inventors: Mika Kasslin, Espoo (FI); Jarkko Kneckt, Espoo (FI); Eng Hwee Ong, Espoo (FI)

(73) Assignee: Nokia Corporation, Espoo (FI)

( * ) Notice: Subject to any disclaimer, the term of this patent is extended or adjusted under 35 U.S.C. 154(b) by 9 days.

(21) Appl. No.: 14/383,598

(22) PCT Filed: Mar. 8, 2012

(86) PCT No.: PCT/FI2012/050226
§ 371 (c)(1),
(2), (4) Date: Sep. 8, 2014

(87) PCT Pub. No.: WO2013/132135
PCT Pub. Date: Sep. 12, 2013

(65) Prior Publication Data
US 2015/0131435 A1 May 14, 2015

(51) Int. Cl.
*H04W 4/00* (2009.01)
*H04W 28/02* (2009.01)
*H04W 84/12* (2009.01)
*H04W 48/16* (2009.01)
*H04W 74/08* (2009.01)

(52) U.S. Cl.
CPC ..... *H04W 28/0289* (2013.01); *H04W 28/0205* (2013.01); *H04W 48/16* (2013.01); *H04W 84/12* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 2007/0081462 A1 | 4/2007 | Gefflaut et al. | |
| 2007/0232307 A1 | 10/2007 | Ibrahim et al. | |
| 2008/0268787 A1* | 10/2008 | Gholmieh | H04H 60/32 455/67.11 |
| 2010/0293275 A1 | 11/2010 | Rezaiifar et al. | |
| 2011/0267948 A1 | 11/2011 | Koc et al. | |
| 2012/0063340 A1* | 3/2012 | Waters | G01S 5/0242 370/252 |

FOREIGN PATENT DOCUMENTS

WO 2010074471 A2 7/2010

OTHER PUBLICATIONS

Extended Search Report of EP Application No. 12870486.3-1857/2823665, PCT/FI2012050226, dated Oct. 21, 2015.
Ministry of Science and Technology National Office of Intellectual Property, Socialist Republic of Vietnam Independence—Freedom—Happiness, No. 2954/SHTT-SCI, Results of Examination as to form, dated Jan. 27, 2015.
International Search Report of PCT/FI2012/050226 dated Dec. 4, 2012.

* cited by examiner

*Primary Examiner* — Anh-Vu Ly
(74) *Attorney, Agent, or Firm* — Banner & Witcoff, Ltd.

(57) ABSTRACT

There is provided a method comprising: causing a station capable of communication in a wireless network to acquire knowledge of a medium usage indicator with respect to at least one channel applicable for transmission of a scanning request; and determining a transmission time for a next scanning request at least partly based on the medium usage indicator.

16 Claims, 5 Drawing Sheets

EFFICIENCY IN WIRELESS NETWORK

FIELD

The invention relates generally to wireless networks. More particularly, the invention relates to controlling the amount of discovery protocol messages.

BACKGROUND

In some wireless networks, a device may use active scanning to find out available networks for communication. Active scanning refers to a method where the device transmits a scanning request message. If the device receives a scanning response message from an access node, it may determine that there is a network nearby to which the device may possibly connect. If the neighborhood comprises a large number of devices and/or a large number of access nodes, frequent transmission of these scanning messages may cause congestion.

BRIEF DESCRIPTION OF THE INVENTION

According to an aspect of the invention, there are provided methods as specified in claim 1.

According to an aspect of the invention, there are provided apparatuses as specified in claim 8.

According to an aspect of the invention, there is provided a computer program product as specified in claim 16.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising processing means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents an example of an extended service set in a wireless local area network (WLAN);

Figure 9A:
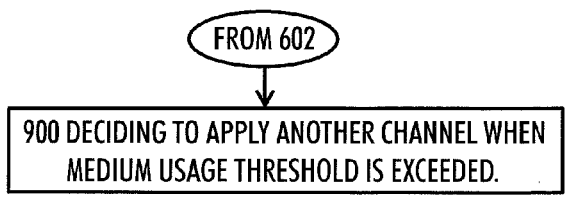
Figure 9B:
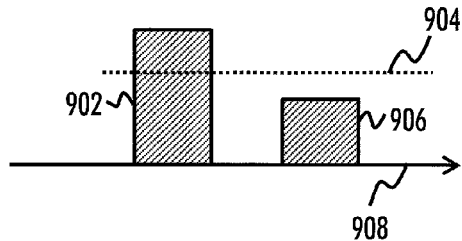
Figure 13A:
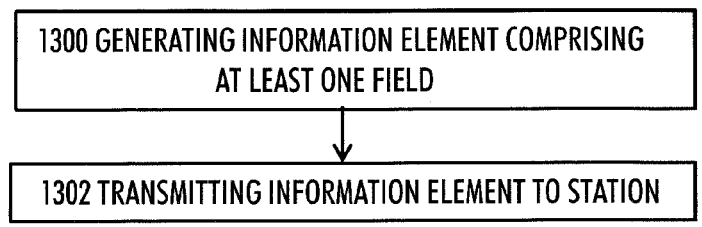
Figure 13B:
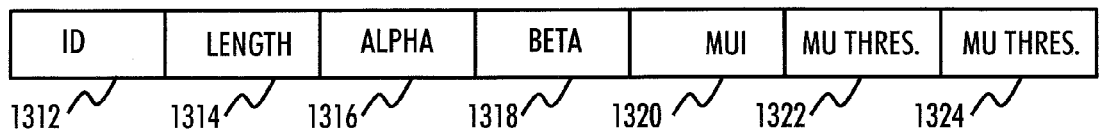

FIGS. 5 to 9A present methods according to some embodiments;

FIG. 9B depicts an example of a plurality of channels with different utilization ratios;

FIGS. 10 to 13A illustrate methods according to some embodiments;

FIG. 13B shows an information element according to an embodiment; and

Figure 14:
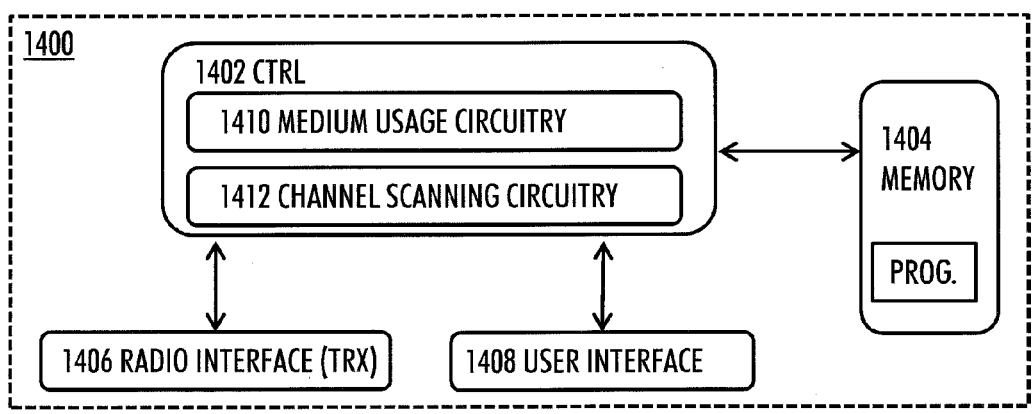
Figure 15:
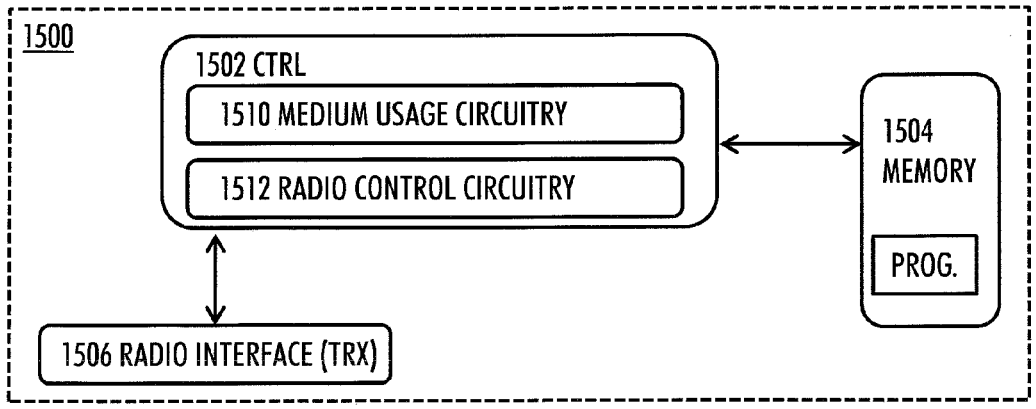

FIGS. 14 and 15 illustrate apparatuses according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The number of IEEE 802.11-enabled mobile devices is ever increasing. The IEEE 802.11 is a set of standards for implementing wireless local area network (WLAN), also known as the Wi-Fi. One problem in the current specifications may occur when a large number of stations (STAs) are constantly entering and leaving the coverage area of an extended service set (ESS), possibly comprising multiple access points (APs). In such scenario the network may become congested due to large number of discovery protocol messages, for example. A task group of the IEEE 802.11, namely TGai, focuses on the issue and tries to minimize the time that STAs 108 to 114 spend in the initial link setup while maintaining secure authentication. However, current solutions do not meet the requirements set for scalability and resource efficiency in the scenario with large number of stations and access points, for example.

Figure 1:
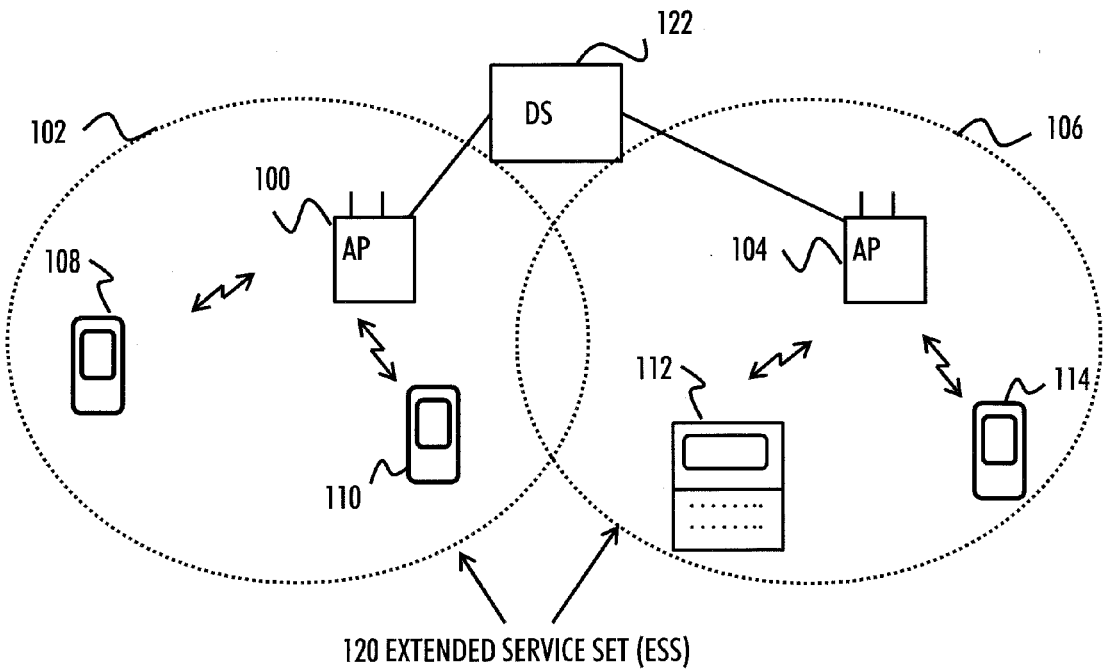

In the nomenclature of IEEE 802.11, a service set comprises all the devices associated with the WLAN/WiFi. Referring to FIG. 1, a basic service set (BSS) 102, 106 comprises a single access point (AP) 100 or 104, providing coverage to a corresponding coverage or service area, together with all associated stations (STAs) 108 to 114. As shown, the STAs 108 to 114 may comprise a mobile phone, a palm computer, a wrist computer, a laptop, a personal computer, etc. Thus, the STA 108 to 114 may be any device capable to access the WLAN radio air interface. The AP 100s and 104, each acts as a master to control the stations 108 to 114 within the corresponding BSS 102, 106, respectively. The access point 100, 104 may be a WLAN base station, for example. The extended service set (ESS) 120, on the other hand, is a set of one or more interconnected BSSs 102, 106 and integrated local area networks that appear as a single BSS to the logical link control layer at any station 108 to 114 associated with one of the BSSs 102, 106. The set of interconnected BSSs 102, 106 may apply the same channel, or communicate on different channels to boost aggregate throughput. FIG. 1 also shows a distribution system (DS) 122 for interconnecting the access points of the ESS 120. The DS 122 may be a wireless or a wired network element allowing the access points to communicate with each other.

As said, there may be vast number of APs 100, 104 and stations 108 to 114 in one ESS 120, which may lead to congestion in the network. Congestion may occur when the capacity of a shared resource is exceeded. Network congestion may occur due to several reasons, such as the number of the STAs 108 to 114, the arrival rate of the STAs 108 to 114, and local contention. An example scenario where congestion may occur is in a discovery process for the AP 100, 104 to connect with. In particular, when any of the stations 108 to 114 enters the ESS 120, the stations 108 to 114 may need to do an initial setup with an AP 100 or 104 to establish WLAN connectivity. The first step of the initial setup may be the discovery of an AP 100/104. This may conventionally be performed by applying an active scanning mode or a passive scanning mode.

Figure 2A:
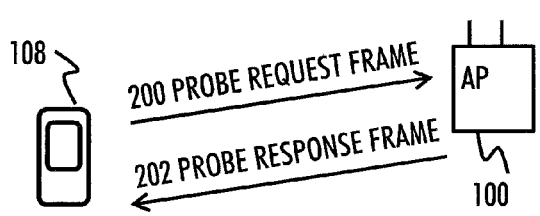
FIGS. 2A and 2B show examples of an active and a passive scanning.

In the active mode, as shown in FIG. 2A with the station 108 and the AP 100, the station 108 actively transmits a probe request frame 200 to the APs 100, or to a plurality of APs 100, 104. The probe request frame (or simply a request) 200 may comprise a request for the receiving party 100 to communicate certain information back to the requesting party 108. For example, the station 108 may send the probe request frame 200 to determine which access points 100, 104 are within its range. After sending the request 200, the station 108 may wait for a probe response frame (or simply a response) 202. The response 202 may comprise capability information, supported data rates, etc. In addition, the probe response 202 may be sent only upon meeting specific criteria (if any) with respect to the probe request frame 200. Such exchange of the request message 200 and the response message 202 may also encompass that of the generic advertisement service (GAS) protocol. It is worth noticing that such active scanning procedure is not used only for the initial access, e.g. when the STA 108 is in an unassociated state, but the active scanning procedure may be applied also for a discovery of a better AP, e.g. when the STA 108 is in an associated state.

Figure 2B:
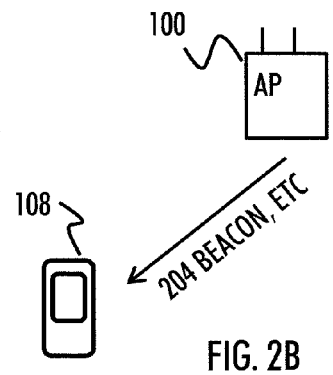

In the passive mode, as shown in FIG. 2B, the station 108 listens to a beacon 204 (or some other predetermined signal such as a measurement pilot) from the AP 100, for example. The beacon 204 may contain a service set identifier (SSID), timestamp, and/or other pertinent information regarding the access point 100, for example, in order to enable the station 108 to associate with the AP 100. The station 108 may be bounded by a MaxChannelTime duration when listening to the beacon 204. In other words, the STA 108 may listen only up to the MaxChannelTime in a given channel. This may ensure that the STA 208 may switch to another channel if no AP 100/104 exists in the given channel.

Such active/passive scanning mode may be adequate when the number of new STAs and the number of responding APs in a given time period are small. However, when the number of STAs 108 to 114 simultaneously entering an ESS 120 and the number of responding APs 100, 104 in the ESS 120 are large, efficient mechanisms that scale well with such a large number of STAs and APs may be of use. Moreover, some specifications require the responding AP to perform contention before the transmission of the probe response frame. Contention may occur when there are at least two STAs competing for a shared resource, such as frequency band. A listen-before-talk-approach is an example of a contention based protocol.

There is currently no mechanism in the 802.11 specification or in the proposals to the TGai to control amount of discovery protocol messages (such as the request 200 and the response 202) based on the situation and operating environment. This implies that scanning STAs 108 to 114 may continue to transmit probe request frames 200 when the medium is congested due to the retransmission of collided probe responses 202, for example. This may result in the collision of probe request 200 and probe response frames 202. These collisions may drive the medium into a state of saturation and cause high latency in active scanning procedure which is undesirable. Thus, there is a need for an adaptive discovery protocol message congestion control mechanism to control and self-regulates the channel utilization of the ESS 120 in a distributed manner in the presence of a large number of STAs 108 to 114 and responding APs 100, 104.

Figure 3A:
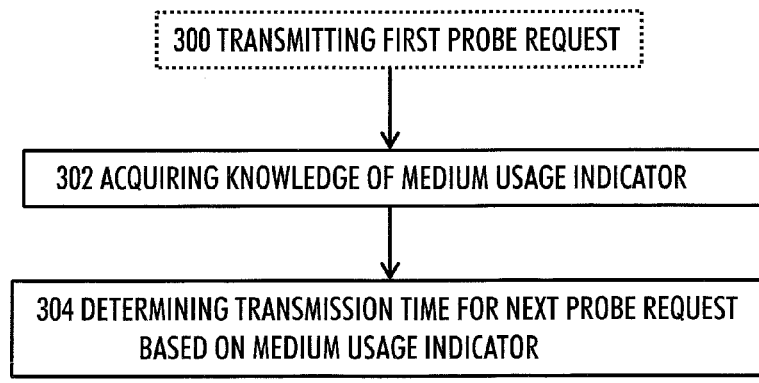
FIG. 3A shows a method according to an embodiment.

Therefore, as shown in FIG. 3A, it is proposed that the station 108 (or any of the stations 108 to 114, station 108 is used for simplicity reasons) is caused to acquire, in step 302, knowledge of a medium usage indicator (MUI) with respect to at least one channel applicable for transmission of a scanning request. The scanning request may be seen as a general term for active scanning. One example of a scanning request is the probe request 200. For the sake of simplicity, the description is written so that the scanning request is the probe request 200. The channel(s) applicable for the transmission of the probe request 200 may be predetermined by the network or by the station, for example. The station 108 may also determine a transmission time for the next probe request (as the scanning request) at least partly based on the acquired MUI in step 304. It is known that the channel capacity varies over time in which the variation is dependent on both the channel and network conditions. This may make the congestion level unpredictable, In other words, the ESS 120 of the WLAN may saturate at different points even in the case of sources with the same average data rate or constant arrival rate. Thus, it may be of importance to acquire the level of the congestion by means of the MUI. Without loss of generality, the MUI may be any local parameter which may be measured or estimated by the STA and may provide feedback on the channel condition. For example, channel utilization ratio, collision probability, transmission probability, MAC service time, queue length, MAC delay, packet loss rate, throughput efficiency, and number of retransmission attempts are such local parameters which may indicate the prevailing channel conditions. One example benefit of using the MUI such as the channel utilization ratio may be that it is a local parameter that can be used to control the global behavior of the system. It should be noted that the stations and the access points perceive similar channel utilization ratio of the medium, for example.

It should be noted that even though the description is written from the point of view of the probe request as the scanning request, the proposed solutions may be applicable for any frame to be transmitted, i.e. not only the probe request frame. Similarly, even though the specification is written from the point of view of the non-AP station 108 to 114, the embodiments are applicable also for the access point 100/104.

In an embodiment, the medium usage indicator is obtained from the AP 100 and/or 104. When the congestion detection, which comprises determining the medium usage indicator (or medium usage value), is performed by the AP 100 and/or 104, the AP 100 and/or 104 may broadcast the determined medium usage indicator to the non-AP STAs 108 to 114. This may be advantageous as then the STA 108 may acquire the information after entering the ESS 120 without the need to determine the MUI itself.

In another embodiment, one or more of the non-AP STAs 108 and 114, i.e. the scanning stations, may determine the MUIs for different channels in a distributed manner. The MUI may be determined by the STA 108, for example, based on at least one of the following: a transmitting or receiving time, a clear channel assessment (CCA), and/or a network allocation vector (NAV). Similarly, the AP 100/104 may apply the transmitting or receiving time, the CCA, and/or the NAV, for example, to determine the MUI. The CCA procedure, as well as the NAV procedure, is known to a person skilled in the art. In short, the CCA may be performed on the channel to determine whether or not the channel is free prior to transmitting a packet. The NAV is a virtual carrier sensing mechanism used with wireless network protocols. The NAV may reduce the need for physical carrier sensing at the air interface in order to save power.

Figure 4A:
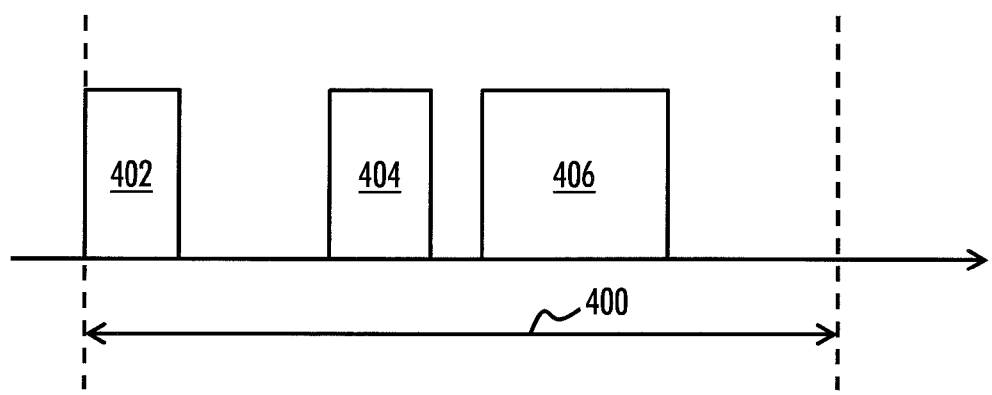
FIG. 4A illustrates an example way of determining a utilization ratio for a channel.

In an embodiment, the MUI comprises a channel utilization ratio. The channel utilization ratio (CUR) may be defined as $$CUR = \frac{\sum (\text{busy period})}{T_{observation}}, \quad (1)$$

where, referring to FIG. 4A, busy periods include time periods 402, 404 and 406 during which the scanning STA 108 is transmitting or receiving, or the channel is indicated as busy due to the CCA or the NAV analysis, for example. The $T_{observation}$ is the observation period 400 in FIG. 4A. Thus, the AP 100/104 and/or the STA 108 to 114 may apply Equation (1) to determine the CUR which may be used as the indicator for the medium usage.

In an embodiment, the MUI comprises a collision probability. The scanning station may determine the collision probability or the scanning station may receive such information from any access point 100, 104 in order to apply the collision probability metric as a feedback of medium condition. The collision probability may be determined as a closed-form solution through numerical analysis or estimated through a measurement process which may distinguish between a collision and link error from an unsuccessful transmission by the AP 100/104 and/or the STA 108 to 114.

In an embodiment, the MUI comprises a transmission probability which may be defined as the probability that a STA transmits in a randomly chosen slot time given that the STA has packets to transmit. The scanning station may determine the transmission probability or the scanning station may receive such information from any access point 100, 104 in order to apply the transmission probability metric as a feedback of medium condition. The transmission probability may be determined as a closed-form solution through numerical analysis or estimated through a measurement process by the AP 100/104 and/or the STA 108 to 114.

In an embodiment, the MUI comprises a MAC service time which may be defined as the time when a head-of-line packet starts contending for medium access to the time it is successfully received, i.e., contention delay. The scanning station may determine the MAC service time or the scanning station may receive such information from any access point 100, 104 in order to apply the MAC service time metric as a feedback of medium condition. The MAC service time may be determined as a closed-form solution through numerical analysis or estimated through a measurement process by the AP 100/104 and/or the STA 108 to 114.

In an embodiment, the MUI comprises a queue length. The scanning station may determine the queue length or the scanning station may receive such information from any access point 100, 104 in order to apply the queue length metric as a feedback of medium condition. The queue length may be determined as a closed-form solution through numerical analysis or estimated through a measurement process by the AP 100/104 and/or the STA 108 to 114.

In an embodiment, the MUI comprises a MAC delay which may be defined as the time when a packet is first inserted into the transmission queue to the time it is successfully received, i.e., queuing delay plus contention delay. The scanning station may determine the MAC delay or the scanning station may receive such information from any access point 100, 104 in order to apply the MAC delay metric as a feedback of medium condition. The MAC delay may be determined as a closed-form solution through numerical analysis or estimated through a measurement process by the AP 100/104 and/or the STA 108 to 114.

In an embodiment, the MUI comprises a packet loss rate which may be defined as the percentage of packet loss due to: (i) buffer overflow condition; (ii) a packet exceeding its maximum retry limit; or (iii) a packet exceeding its useful MSDU lifetime. The scanning station may determine the packet loss rate or the scanning station may receive such information from any access point 100, 104 in order to apply the packet loss rate metric as a feedback of medium condition. The packet loss rate may be determined as a closed-form solution through numerical analysis or estimated through a measurement process by the AP 100/104 and/or the STA 108 to 114.

In an embodiment, the MUI comprises a throughput efficiency which may be defined as the ratio of a STA's throughput and its data rate or normalized throughput of a STA. The scanning station may determine the throughput efficiency or the scanning station may receive such information from any access point 100, 104 in order to apply the throughput efficiency metric as a feedback of medium condition. The throughput efficiency may be determined as a closed-form solution through numerical analysis or estimated through a measurement process by the AP 100/104 and/or the STA 108 to 114.

In an embodiment, the MUI comprises a number of retransmission attempts. The scanning station may determine the number of retransmission attempts or the scanning station may receive such information from any access point 100, 104 in order to apply the number of retransmission attempts metric as a feedback of medium condition. The number of retransmission attempts may be determined through a measurement process by the AP 100/104 and/or the STA 108 to 114.

Note that the above example MUIs as seen by a STA, such as an AP or a non-AP STA, may be different in the case of an infrastructure BSS due to the asymmetric load difference between the AP and its associated STA, for example. Therefore, the MUI derived from the AP and STA may be used jointly to provide a better estimate of the prevailing channel conditions and to determine the resultant MUI to be used. Such joint application of the information obtained from the AP and the information determined by the station 108 may comprise taking a mean, minimum, or maximum from the acquired MUIs of the AP and of the STA, and applying that resultant MUI, for example.

Figure 3B:
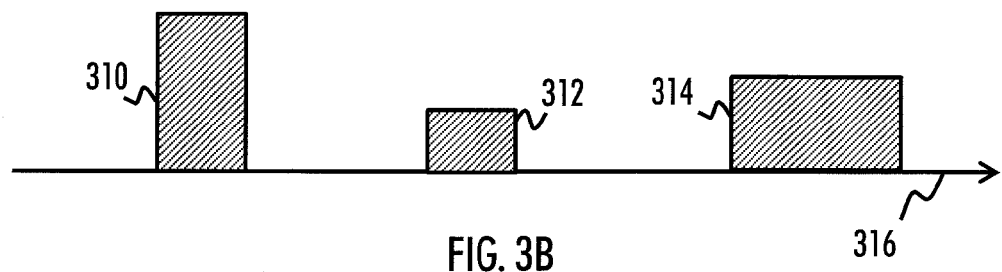
FIG. 3B shows an example of a plurality of channels with different utilization ratios.

The MUI may be acquired for one or more channels. In an embodiment, the MUI is acquired for many channels. The scanning station may itself determine the MUI for many channels or it may receive the information regarding the MUI of some channels, or a combination of the above may take place. In FIG. 3B it is shown that different channels 310 to 314 on the frequency domain 316 may have different levels of congestion, represented with the height of the block. The width of the blocks 310 to 314 may be seen to represent different channel widths, for example. However, the width of the channels 310 to 314 may be the same as well, although not shown in FIG. 3. In some channels the level of congestion may exceed the capacity of the channel, thus rendering those channels not optimal for transmission of the probe request 200. Therefore, identifying those sub-optimal channels may by means of the MUI may be advantageous.

In an embodiment, the scanning station 108 may transmit a first probe request before acquiring knowledge of the MUI, as shown in step 300 of FIG. 3A. Thus, a scanning STA 108 may start by transmitting the first probe request transmission even it does not yet have the medium usage measurements or estimates. This may be advantageous in that there may not be any unnecessary delays required before the first probe request transmission. Then, the medium usage indicator acquisition may be performed, for example according to Equation (1). The station 108 may, for example, determine whether the AP 100/104 is broadcasting any medium usage related information. If the AP 100/104 is not broadcasting the MUI, then the station 108 may itself determine the MUI. Thus, an estimate of the medium usage may be available before the next probe request transmission after step 302. This embodiment thus minimizes the time spent on active scanning.

In another embodiment, the station 108 does perform the MUI acquisition before transmission of the first probe request. In this embodiment, the determination of the transmission time for the next probe request in step 304 refers to the transmission time of the first probe request. Thus, the step 300 of FIG. 3A may be omitted.

The scanning station 108 may at any time or upon successful reception of a probe response frame 202 abort the transmission of subsequent probe request frame 200 at the next scheduled transmission interval. In this manner, no unnecessary probe request is transmitted even though it has been scheduled. This may allow for a reduction in the congestion of the channel, minimization of the scanning duration and of power consumption. For example, when the scanning station 108 has successfully discovered an AP 100/104 that met its requirements, the station 108 may abort from transmission of further requests. Thus, the station 108 may associate with that AP 100/104. To associate means that the STA 108 is registered with the AP 100/104 to gain access of all services of the infrastructure BSS and that of the ESS 120 to which the associated AP 100/104 belongs to. E.g., the station 108 may then start to send and receive data frames to/from the AP 100/104. However, it is to be noted that the STA 108 may need to be authenticated before association.

The proposed solution may be seen to regulate medium usage due to the discovery messages and relieve network congestion in the presence of a large number of discovering STAs, such as at least one hundred, and multiple APs, such as at least five, in an ESS environment. The proposed adaptive discovery protocol message congestion control mechanism may also be seen as a closed-loop control mechanism which may serve to function as a feedback to regulate the medium usage of the ESS 120. Further, one advantage appreciated by a skilled person is that the embodiments are compatible with the earlier IEEE 802.11 specifications, and hence may also be applied for general congestion control purposes in the WLAN networks of earlier specifications.

Figure 4B:
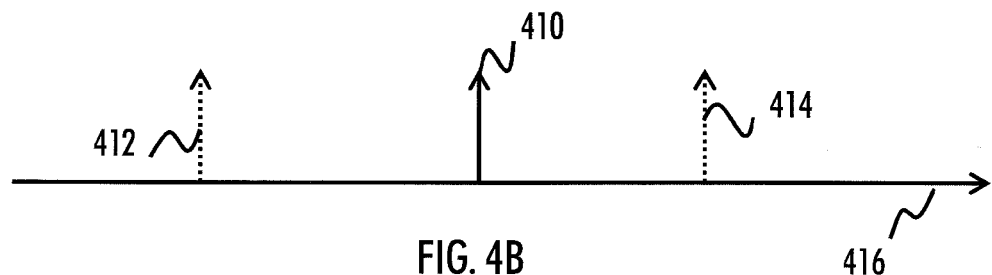
FIG. 4B shows an example of changing the transmission time of a probe request, according to an example.

In an embodiment, the determination of the transmission time of the next probe request 200 comprises, as shown in FIG. 4B, transmitting the next probe request 200 at a later 414 time when the MUI indicates that the channel is congested. In another embodiment, the determination of the transmission time of the next probe request 200 comprises transmitting the next probe request 200 at an earlier time 412 when the MUI indicates that the channel is not heavily congested. For example, it may be that the next probe request 200 is scheduled to be transmitted at a time instant 410. The determination of the transmission time of the next probe request 200 at least partly based on the MUI may change the transmission time to be either earlier 412 or later 414 than the time instant 410 on the time domain 416. Whether the channel is congested or not may depend on a predetermined threshold. There may be different levels of congestions and, thus, different thresholds for each congestion level.

Figure 5:
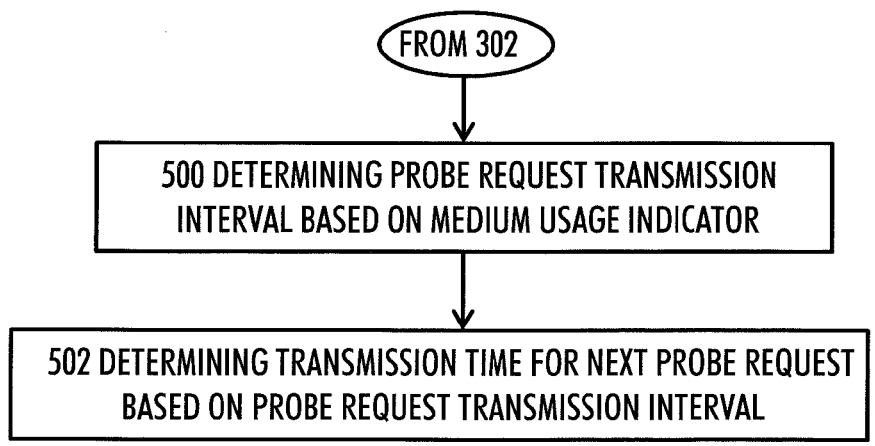

In an embodiment, as shown in FIG. 5, the determination of the transmission time for the next probe request in step 304 of FIG. 3A comprises determining, in step 500, a probe request transmission interval (TI) at least partly based on the MUI. Moreover, the station 108 may, in step 502, determine a transmission time for the next probe request at least partly based on the probe request TI. Thus, the transmission interval is scaled according to the prevailing medium usage. It may be adapted according to current needs, for example. This may provide several benefits over a static transmission interval which is non-optimal and may not necessary fulfill the objective of congestion control.

Figure 6:
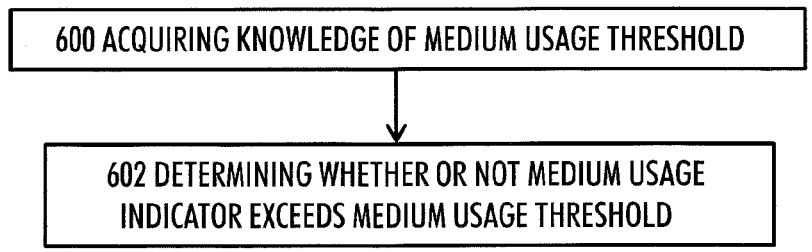

In an embodiment, the station 108 may, as shown in step 600 of FIG. 6, acquire knowledge of at least one medium usage threshold $MU_T$. The medium usage threshold may be a channel utilization threshold, for example. Thus, the acquired MU threshold may relate to any of the possible MUIs, such as to channel utilization ratio, collision probability, transmission probability, MAC service time, queue length, MAC delay, packet loss rate, throughput efficiency, and number of retransmission attempts, for example.

The station 108 may further in step 602 determine whether or not the MUI exceeds a certain one(s) of the acquired at least one $MU_T$. The threshold(s) may be acquired from the network, for example, which may have determined them based on empirical or virtual derivation. In an embodiment, the acquired threshold(s) may comprise an upper threshold $MU_T^U$ beyond which the medium is considered to be congested. In an embodiment, the acquired threshold(s) may comprise a lower threshold $MU_T^L$, which defined as $0<MU_T^L<MU_T^U<1$. Above the $MU_T^L$, the medium may be considered to be moderately or highly loaded, but not lightly loaded. Thus, when MUI is less than or equal to $MU_T^U$, it indicates the region where the load in the medium (i.e. in the channel) varies from lightly to moderate load. In the case of lightly loaded medium, all packets including the probe request 200 may be transmitted almost instantaneously as the queue is empty most of the time. In the case of moderately loaded medium, most packets, possibly also the probe request 200, may wait a variable time before they are transmitted as the queue is non-empty. When the MUI is greater than $MU_T^U$, it indicates the congestion region in which packet transmission delay increases, and some packets are dropped due to buffer overflow or exceeding their retry limit.

When there are many thresholds acquired, the station 108 may be precoded to consider a certain one of them, such as the $MU_T^U$ or the $MU_T^L$, for example. Alternatively, in some embodiment, the station 108 may consider many of them and determine whether the MUI exceeds, for example, only the s $MU_T^L$ or also the $MU_T^U$, for example.

Figure 7:
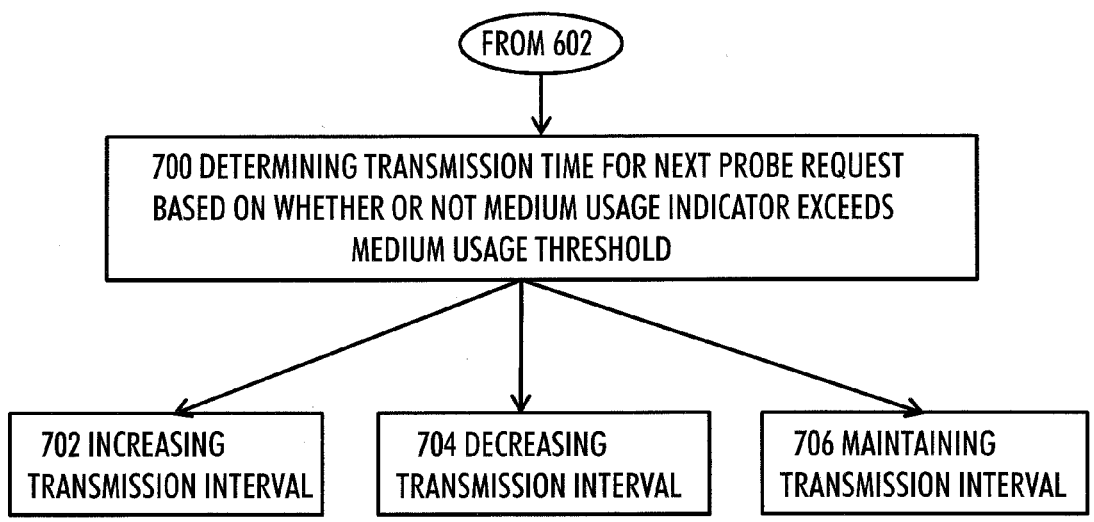

Therefore, in an embodiment, as shown in FIG. 7, after it is determined whether or not the MUI exceeds a certain threshold in step 602, the station 108 may in step 700 determine the transmission time for the next probe request. The transmission time determination may comprise decreasing the transmission rate (i.e. increasing the transmission interval) of the probe request 200 in step 702 when the $MU_T^U$ is exceeded. In another embodiment, the transmission time determination may comprise increasing the transmission rate (i.e. decreasing the transmission interval) of the probe request 200 in step 704 when the $MU_T^U$ is not exceeded. In yet another embodiment, the transmission time determination may comprise increasing the transmission rate (i.e. decreasing the transmission interval) of the probe request 200 in step 704 when the $MU_T^L$ is not exceeded. In yet one embodiment, the transmission time determination may comprise maintaining the current transmission rate or interval of the probe request 200 in step 706 when the MUI is between the $MU_T^L$ and the $MU_T^U$. Thus, the scanning STA 108 may transmit less frequently (or decrease its transmission rate) when the medium is highly loaded (congested) and vice versa, according to the prevailing usage of the medium.

For example, in an embodiment, the probe request 200 transmission interval $TI_{Tx}$ may be computed as $$TI_{Tx} = \frac{T_{suc}}{\alpha}, \quad (2)$$

where $T_{suc}$ is the transmission duration of a successful probe request frame 200, which may be known by the station. Parameter α is an initial share of the medium to be used by the STA 108 for probe request 200 transmissions. The parameter α may be obtained via a broadcast message or it may be known to the station beforehand. The parameter α may vary between 0 and 1. It is to be noted that the $TI_T$ of the probe request frame 200 may be changed by varying α. Hence, a may be updated after each transmission of the probe request frame 200, or after a predetermined time period, according to an additive increase principle as $$\alpha = \alpha + \beta \times TI_{Tx} \quad (3)$$

when the medium is lightly or moderately loaded, i.e., MUI is less than or equal to $MU_T^U$. However, when MUI exceeds the $MU_T^U$, i.e. when the medium is congested or heavily loaded, a may be updated after each transmission of the probe request frame 200, or after a predetermined time period, according to a multiplicative decrease principle as $$\alpha = \alpha \times \beta \frac{MU_T^U}{MUI}. \quad (4)$$

Thus, when the medium is heavily loaded, the scanning STA 108 (or any of the STAs 108 to 114) may choose to increase its next probe request transmission interval according to (2) and (4). Parameter β may be seen as an additional scaling factor to further control the rate of increase or decrease in (3) and (4), respectively. The parameter β may be obtained from the network or it may be precoded with the station 108. The parameter β may also vary between 0 and 1. The value of β may be set to 1 by default. It may be adjusted by the non-AP STA 108 to 114 or the AP 100/114 to limit the rate of increase or decrease according to the prevailing medium usage value.

As seen from (3) and (4) the proposed mechanism is adaptive which may reduce the scanning latency when the medium is lightly loaded and may throttle the medium usage when it is heavily loaded.

Figure 8:
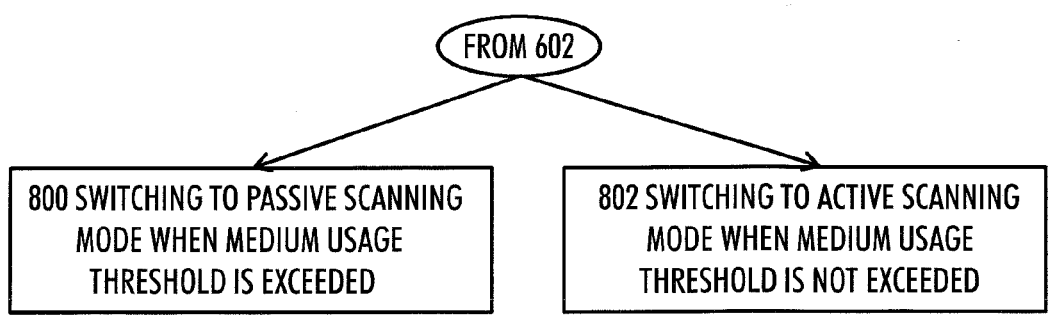

In an embodiment, as shown in FIG. 8, after it is determined whether or not the MUI exceeds the $MU_T^U$ in step 602, the station 108 may in step 800, when currently applying the active scanning mode (depicted in FIG. 2A), switch to the passive scanning mode (depicted in FIG. 2B) under heavily loaded or congested medium. In another embodiment, under lightly or moderately loaded medium (i.e. the acquired MUI does not exceed the $MU_T^U$), the station 108 may in step 802, when currently applying the passive scanning mode, switch to the active scanning mode.

These embodiments may all allow for an autonomous switching between the modes, which may offer ease of implementation, for example.

In an embodiment, as shown in FIG. 9A, after it is determined whether or not the MUI exceeds the $MU_T^U$ in step 602, the station 108 may in step 900 decide to apply another channel applicable for the transmission of the probe request 200 when the medium usage threshold is exceeded (i.e. the acquired MUI exceeds the $MU_T^U$). As shown in FIG. 9B, it is possible that the MUI of the channel 902 that the station 108 is first going to scan exceeds the $MU_T^U$, marked with reference numeral 904. When the condition of MUI exceeding the $MU_T^U$ is detected, the station 108 may switch to another channel 906 on the frequency domain 908. It may be that the MUI of the second channel 906 does not exceed the $MU_T^U$, thus making it more suitable for the transmission of the probe request 200. This may allow the station 108 to associate to an AP 100/104 more quickly. The second channel 906 may be any channel among the list of supported channels for the probe request 200 transmission.

In another embodiment, the utilization threshold 904 is a lower threshold $MU_T^L$, which defines a level beyond which the channel is considered to be moderately utilized, as described earlier. Thus, the station 108 may switch to the next supported channel when the MUI exceeds the $MU_T^L$, not necessarily the $MU_T^U$. This may allow quicker association to an AP 100/104, as the station 108 need not spend any time in scanning the first channel 902 which is at least moderately loaded.

Figure 10:
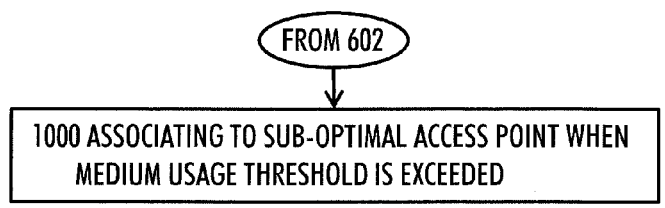

In an embodiment, as shown in FIG. 10, after it is determined whether or not the MUI exceeds the $MU_T^U$ in step 602, the station 108 may in step 1000 associate to a connectable sub-optimal access point when the medium usage threshold is exceeded. In other words, when there is an AP 100 or 104 that does not provide optimal performance for the STA 108, the STA 108 may nevertheless temporarily associate with the sub-optimal AP 100 or 104 in order to get some access to the network in timely manner. The sub-optimal AP 100 or 104 may not be able to meet all the requirements of the station 108, but the sub-optimal AP 100 or 104 may nevertheless be able to associate the station 108 and connect the station 108 to the network. Subsequently, a better or optimal AP may be discovered by repeating the scanning procedures depicted in FIGS. 2A and 2B.

Figure 11:
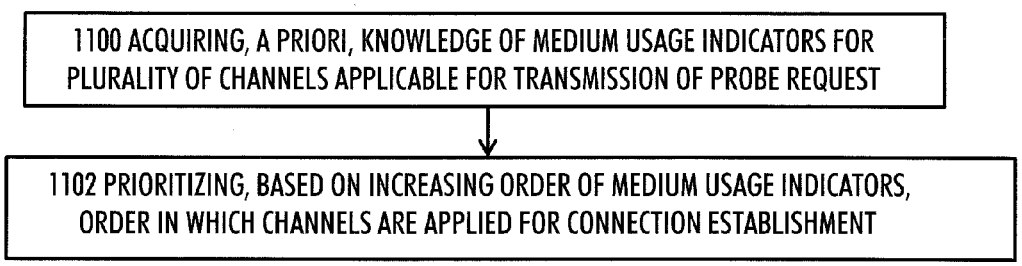

Referring now to FIGS. 3B and 11, in an embodiment, the scanning station in step 1100 acquires, a priori, knowledge of MUIs for a plurality of channels 310 to 314 applicable for the transmission of the probe request. The station 108 may acquire the MUIs for several channels from network, for example. Based on either an increasing or a decreasing order of the MUIs, the station may in step 1102 prioritize the order in which channels are scanned, i.e. applied for connection establishment to the AP 100 and/or 104 of the WLAN. For example, the station 108 may first perform scanning on channel 312. If not successful, the station 108 may proceed to channel 314 and finally to 310. This may be advantageous so that the station 108 rapidly established a connection to the AP 100/104.

Figure 12:
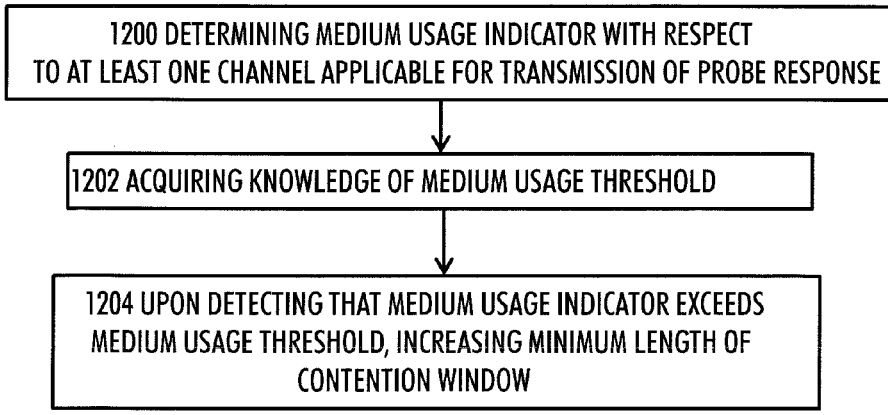

In an embodiment as shown in FIG. 12, the access point 100 of FIG. 2A, for example, may be in step 1200 caused to determine the MUI with respect to at least one channel applicable for transmission of the probe response 202. The determination may take place as described above, for example by applying the transmitting or receiving time, the CCA, and/or the NAV. The AP 100 may also, in step 1202, acquire knowledge of a medium usage threshold. The AP 100 may acquire the threshold from the network or it may determine such threshold itself based on empirical experiments, for example. The threshold may be the upper threshold $MU_T^U$, for example. Then, in step 1204, upon detecting that the MUI exceeds the medium usage threshold, the AP 100 may increase the minimum length of a contention window based on the MUI, the medium usage threshold and the current length of minimum contention window.

The contention window may determine an additional random backoff time that the contending AP 100 should observe before it is allowed to transmit so that the probability of collision is minimized. The AP 100 may decrease the backoff counter only during time when the medium is idle. Hence, the AP 100 may need to determine the medium state, which may comprise one of the MUIs, during the contention window period.

The new minimum length of the contention window may be determined such that the ratio of the contention window is equal to the ratio of the medium usage according to the following equation:

$$\frac{W'}{W} = \frac{MUI}{MU_T^U}. \quad (5)$$

In other words, the minimum contention window size W is scaled by the ratio of medium usage indicator MUI with respect to the upper medium usage threshold $MU_T^U$ to derive a new minimum contention window size W'. The purpose of such "recovery" mechanism is to ensure that, when medium is heavily loaded (i.e. the MUI exceeds the $MU_T^U$), the medium recovers quickly. For example, the responding AP 100, upon on its successful or unsuccessful transmission of probe response frame 202, may select a longer contention window size on average so that the congestion in the medium may recover faster. In an embodiment, such recovery mechanism of increasing the minimum contention window size may be interworking with the mechanism of determining the transmission time of the next probe request 200 based on the MUI. The simultaneous application of the two mechanisms may allow efficient congestion avoidance and recovery.

As shown, the proposed adaptive discovery protocol message congestion control mechanism may comprise any or all of the following. It may comprise the congestion detection mechanism based on the feedback of the medium condition (e.g. the MUI) and a control threshold (e.g. $MU_T^U$). It may comprise the discovery protocol message congestion control mechanism based on regulation of a scanning STA's 108 probe request 200 transmission rate according to the prevailing medium usage (e.g. the MUI). Further, it may comprise the recovery mechanism to throttle a responding AP's 100 probe response frame 202 transmission time when the medium is saturated to enable fast recovery to a non-saturation state.

Although the embodiment of FIG. 12 is written from the point of view of the access point, the scanning non-AP station 108 may also perform the determination of the minimum contention window size. The scanning station may apply the new contention window when determining the transmission time of the probe request 200, instead of the probe response 202, for example.

In an embodiment, referring to FIGS. 13A and 13B, the AP 100 and/or 104 may generate, in step 1300, an information element 1310 to be transmitted to at least one station 108 to 114 in step 1302. The AP 100/104 may transmit the generated information element in at least one of the following: a beacon, a probe response 202, and an advertisement frame. Such information element, when received by the station, may ease the implementation of the functionalities regarding the determination of the transmission time of the probe request 200, for example.

As shown in FIG. 13B, the information element 1310 may comprise an element ID 1312 for identifying the element by the receiver. Further, the element 1310 may indicate the length of the element 1310 in field 1314, for example. Further, the information element 1310 may comprise at least one of the following fields: a predetermined maximum share of channel resources α for transmitting at least one probe request 200 by the station in field 1316, a scaling value β applicable by the station for changing a transmission interval of the probe request 200 in field 1318, the medium usage indicator (MUI) with respect to at least one channel applicable for transmission of the probe request 200 in field 1320, at least one medium usage threshold in fields 1322 and 1324. Let us take a look at these fields in more detail.

The Initial Probe Request field 1316 may be defined as an initial percentage of time, linearly scaled from 0% to 100%, which defines the share that the probe request frames 200 are allowed to be transmitted by the STA in the medium. This field may thus be used to carry the value of a.

The additional scaling value β may be carried in field 1318 and it may be used by the station according to Equations (3) and (4), for example. It should be noted that this field 1318 is optional as β may be predefined, for example, as one.

The field 1320 indicating the MUI is optional as the station may also determine the MUI itself. If comprised in the element 1310, the MUI may be defined as the percentage of time, linearly scaled from 0% to 100%, that the medium is sensed to be busy. The MUI may be acquired by applying the transmitting or receiving time, the CCA, and/or the NAV mechanism, for example. If comprised in the element 1310, the indicated MUI may be used by the station as the feedback of the medium condition and the need for an explicit estimation of the MUI by the station may be avoided.

The fields 1322 and 1324 may carry at least one MU threshold, such as the lower threshold and the upper threshold. These fields may be optional, if the station acquires that data in an alternative manner. These fields 1322 and 1324 may be defined as the percentage of time, linearly scaled from 0% to 100%. The upper threshold may denote a level of congestion beyond which the medium is considered as congested. It may function as the set point of the congestion control mechanism and normalizing constant of the congestion recovery mechanism. The lower, i.e. a pre-congestion, threshold field defines a level beyond which the medium is considered as moderately loaded. It may function as a pre-congestion warning from the congestion control mechanism to trigger remedial actions as described above, such as switching to scan the next channel.

An embodiment, as shown in FIG. 14, provides an apparatus 1400 comprising a control circuitry (CTRL) 1402, such as at least one processor, and at least one memory 1404 including a computer program code (PROG), wherein the at least one memory 1404 and the computer program code (PROG), are configured, with the at least one processor 1402, to cause the apparatus 1400 to carry out any one of the above-described functionalities. It should be noted that FIG. 14 shows only the elements and functional entities required for understanding a processing system of the apparatus 1400. Other components have been omitted for reasons of simplicity. It is apparent to a person skilled in the art that the apparatus may also comprise other functions and structures.

In an embodiment, the apparatus 1400 may be or be comprised in a station applicable of communication in an IEEE 802.11 network. It may be an IEEE 802.11ai-capable station. It may be a non-AP station, such as stations 108 to 114 of FIG. 1. The apparatus 1400 may be or be comprised in a terminal device, e.g. a computer (PC), a laptop, a tabloid computer, a cellular phone, a communicator, a smart phone, a palm computer, or any other communication apparatus. Further, the apparatus 1400 may be or comprise a module (to be attached to the station) providing connectivity, such as a plug-in unit, an "USB dongle", or any other kind of unit.

As said, the apparatus 1400 may comprise a control circuitry 1402, e.g. a chip, a processor, a micro controller, or a combination of such circuitries causing the apparatus to perform any of the embodiments of the invention. The control circuitry 1402 may be implemented with a separate digital signal processor provided with suitable software embedded on a computer readable medium, or with a separate logic circuit, such as an application specific integrated circuit (ASIC). The control circuitry 1402 may comprise an interface, such as computer port, for providing communication capabilities. The memory 1404 may store software (PROG) executable by the at least one control circuitry 1402.

As said, the apparatus 1400 may comprise the memory 1404 connected to the control circuitry 1402. However, memory may also be integrated to the control circuitry 1402 and, thus, no memory 1404 may be required. The memory 1404 may be implemented using any suitable data storage technology, such as semiconductor based memory devices, flash memory, magnetic memory devices and systems, optical memory devices and systems, fixed memory and removable memory. The memory 1404 may be for storing data related to the medium usage, for example.

The control circuitry 1402 may comprise a medium usage circuitry 1410 for receiving and/or determining the MUI according to any of the embodiments. The control circuitry 1402 may comprise a scanning circuitry 1412 for performing the active or passive scanning according to any of the embodiments. The circuitry 1412 may, for example, determine the transmission time of the next probe request, the transmission rate of the probe requests, switch to another channel, perform the adaptive congestion avoidance, etc., according to any of the embodiments.

The apparatus 1400 may further comprise radio interface components (TRX) 1406 providing the apparatus with radio communication capabilities with the radio access network. The radio interface components 1406 may comprise standard well-known components such as amplifier, filter, frequency-converter, (de)modulator, and encoder/decoder circuitries and one or more antennas.

The apparatus 1400 may also comprise a user interface 1408 comprising, for example, at least one keypad, a microphone, a touch display, a display, a speaker, etc. The user interface 1408 may be used to control the apparatus 1400 by the user.

An embodiment, as shown in FIG. 15, provides an apparatus 1500 comprising a control circuitry (CTRL) 1502, such as at least one processor, and at least one memory 1504 including a computer program code (PROG), wherein the at least one memory 1504 and the computer program code (PROG), are configured, with the at least one processor 1502, to cause the apparatus 1500 to carry out any one of the above-described functionalities. It should be noted that FIG. 15 shows only the elements and functional entities required for understanding a processing system of the apparatus 1500. Other components have been omitted for reasons of simplicity. It is apparent to a person skilled in the art that the apparatus may also comprise other functions and structures.

In an embodiment, the apparatus 1500 may be or be comprised in an access point applicable of communication in an IEEE 802.11, such as the APs 100, 104 of FIG. 1. The apparatus 1500 may be or be comprised in a base station of the wireless local area network. Further, the apparatus 1500 may be or comprise a module (to be attached to the access point) providing connectivity, such as a plug-in unit, an "USB dongle", or any other kind of unit.

As said, the apparatus 1500 may comprise a control circuitry 1502, e.g. a chip, a processor, a micro controller, or a combination of such circuitries causing the apparatus to perform any of the embodiments of the invention. The control circuitry 1502 may be implemented with a separate digital signal processor provided with suitable software embedded on a computer readable medium, or with a separate logic circuit, such as an application specific integrated circuit (ASIC). The control circuitry 1502 may comprise an interface, such as computer port, for providing communication capabilities. The memory 1504 may store software (PROG) executable by the at least one control circuitry 1502.

As said, the apparatus 1500 may comprise the memory 1504 connected to the control circuitry 1502. However, memory may also be integrated to the control circuitry 1502 and, thus, no memory 1504 may be required. The memory 1504 may be implemented using any suitable data storage technology, such as semiconductor based memory devices, flash memory, magnetic memory devices and systems, optical memory devices and systems, fixed memory and removable memory. The memory 1504 may be for storing data related to the medium usage, for example.

The control circuitry 1502 may comprise a medium usage circuitry 1510 for determining the MUI according to any of the embodiments. The control circuitry 1502 may comprise a radio control circuitry 1512 for replying to the received probe requests, for transmitting beacons, etc., for performing radio resource management, for performing contention window resizing, for generating the information elements, etc. according to any of the embodiments.

The apparatus 1500 may further comprise radio interface components (TRX) 1506 providing the apparatus with radio communication capabilities with the radio access network. The radio interface components 1506 may comprise standard well-known components such as amplifier, filter, frequency-converter, (de)modulator, and encoder/decoder circuitries and one or more antennas. Even though the description has been written from the viewpoint of a wireless local area network, the embodiments may be applicable to other wireless network technologies having similar active scanning approach. The other technologies may comprise cognitive radio networks and/or other applicable wireless networks, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application/specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configured to carry out embodiments of any of the FIGS. 1 to 15. In an embodiment, the at least one processor 1402, the memory 1404, and the computer program code form an embodiment of processing means for carrying out the embodiments of the invention. In another embodiment, the at least one processor 1502, the memory 1504, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but it can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   causing a station capable of communication in a wireless network to acquire knowledge of a medium usage indicator with respect to at least one channel applicable for transmission of a scanning request;
   determining, based at least in part on whether or not the medium usage indicator exceeds a medium usage threshold, a transmission time for a next scanning request; and
   performing at least one of:
      decreasing a scanning request transmission interval when the medium usage indicator does not exceed the medium usage threshold, and
      increasing the scanning request transmission interval when the medium usage indicator exceeds the medium usage threshold.

2. The method of claim 1, wherein the causing the station to acquire the knowledge of the medium usage indicator comprises transmitting a first scanning request.

3. The method of claim 1, wherein the medium usage indicator is obtained from an access point of the wireless network and/or determined based on at least one of a transmitting or receiving time, a clear channel assessment, and a network allocation vector.

4. The method of claim 1, wherein the medium usage indicator comprises at least one of the following: a channel utilization ratio, a collision probability, a transmission probability, a medium access control (MAC) service time, a queue length, a MAC delay, a packet loss rate, a throughput efficiency, and a number of retransmission attempts.

5. The method of claim 1, wherein the determining the transmission time for the next scanning request comprises:
   determining the transmission time for the next scanning request at least partly based on the scanning request transmission interval.

6. The method of claim 1, further comprising:
   acquiring knowledge of a lower medium usage threshold and/or a higher medium usage threshold, and wherein the decreasing the scanning request transmission interval comprises decreasing the scanning request transmission interval when the medium usage indicator does not exceed the lower medium usage threshold, and the increasing the scanning request transmission interval comprises increasing the scanning request transmission interval comprises increasing the scanning request transmission interval when the medium usage indicator exceeds the higher medium usage threshold.

7. The method of claim 1, wherein the next scanning request is a probe request, and the wireless network is a wireless local area network.

8. An apparatus, comprising:
   at least one processor and at least one memory including a computer program code, wherein the at least one memory and the computer program code are configured to, with the at least one processor, cause the apparatus at least to:
   cause a station capable of communication in a wireless network to acquire knowledge of a medium usage indicator with respect to at least one channel applicable for transmission of a scanning request; and determine, based at least in part on whether or not the medium usage indicator exceeds a medium usage threshold, a transmission time for a next scanning request; and perform at least one of:
- decrease a scanning request transmission interval when the medium usage indicator does not exceed the medium usage threshold, and
- increase the scanning request transmission interval when the medium usage indicator exceeds the medium usage threshold.

9. The apparatus of claim 8, wherein the computer program code that causes the apparatus to cause the station to acquire knowledge of the medium usage indicator comprises computer program code that causes the apparatus to transmit a first scanning request.

10. The apparatus of claim 8, wherein the medium usage indicator is obtained from an access point of the wireless network and/or determined based on at least one of the following: a transmitting or receiving time, a clear channel assessment, and a network allocation vector.

11. The apparatus of claim 8, wherein the medium usage indicator comprises at least one of the following: a channel utilization ratio, a collision probability, a transmission probability, a medium access control (MAC) service time, a queue length, a MAC delay, a packet loss rate, a throughput efficiency, and a number of retransmission attempts.

12. The apparatus of claim 8, wherein, the computer program code that causes the apparatus to determine the transmission time for the next scanning request comprises computer program code that causes the apparatus to:
determine the transmission time for the next scanning request at least partly based on the scanning request transmission interval.

13. The apparatus of claim 8, wherein the computer program code further causes the apparatus to:
acquire knowledge of a lower medium usage threshold and/or a higher medium usage threshold, and wherein the computer program code that causes the apparatus to decrease the scanning request transmission interval comprises computer program code that causes the apparatus to decrease the scanning request transmission interval when the medium usage indicator does not exceed the lower medium usage threshold, and wherein the computer program code that causes the apparatus to increase the scanning request transmission interval comprises computer program code that causes the apparatus to increase the scanning request transmission interval when the medium usage indicator exceeds the higher medium usage threshold.

14. The apparatus of claim 8, wherein the scanning request is a probe request, and the wireless network is a wireless local area network.

15. The apparatus of claim 8, wherein the apparatus is a terminal device.

16. A non-transitory storage medium containing a computer program arranged to operate a computer to perform a method comprising:
causing a station capable of communication in a wireless network to acquire knowledge of a medium usage indicator with respect to at least one channel applicable for transmission of a scanning request;
determining, based at least in part on whether or not the medium usage indicator exceeds a medium usage threshold, a transmission time for a next scanning request; and
performing at least one of:
- decreasing a scanning request transmission interval when the medium usage indicator does not exceed the medium usage threshold, and
- increasing the scanning request transmission interval when the medium usage indicator exceeds the medium usage threshold.

* * * * *